Sept. 23, 1958     I. WEINGLAS     2,852,961
ROTARY DEVICE FOR CUTTING SAW BLADES
Filed May 20, 1957     3 Sheets-Sheet 1
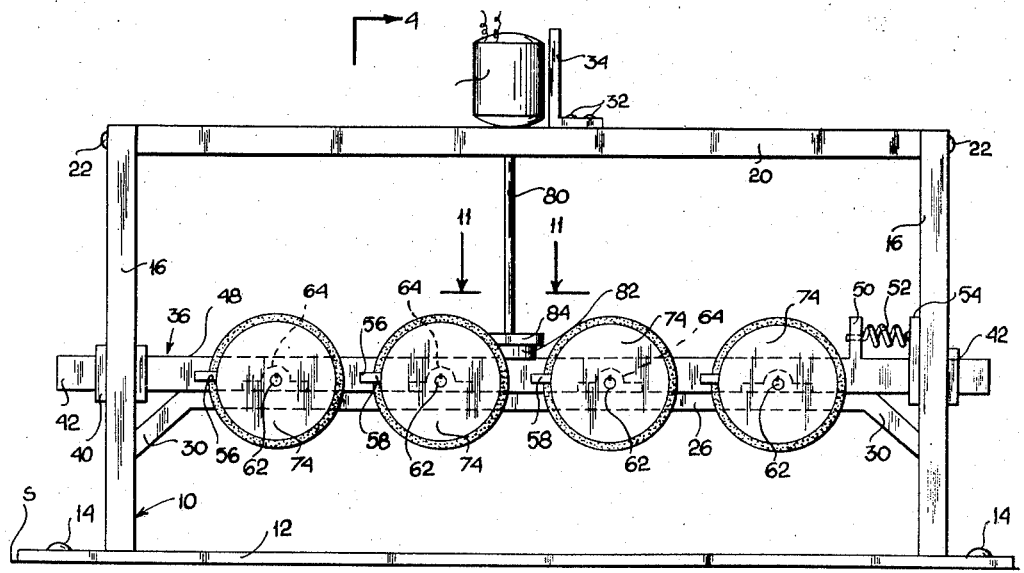
Fig_1_
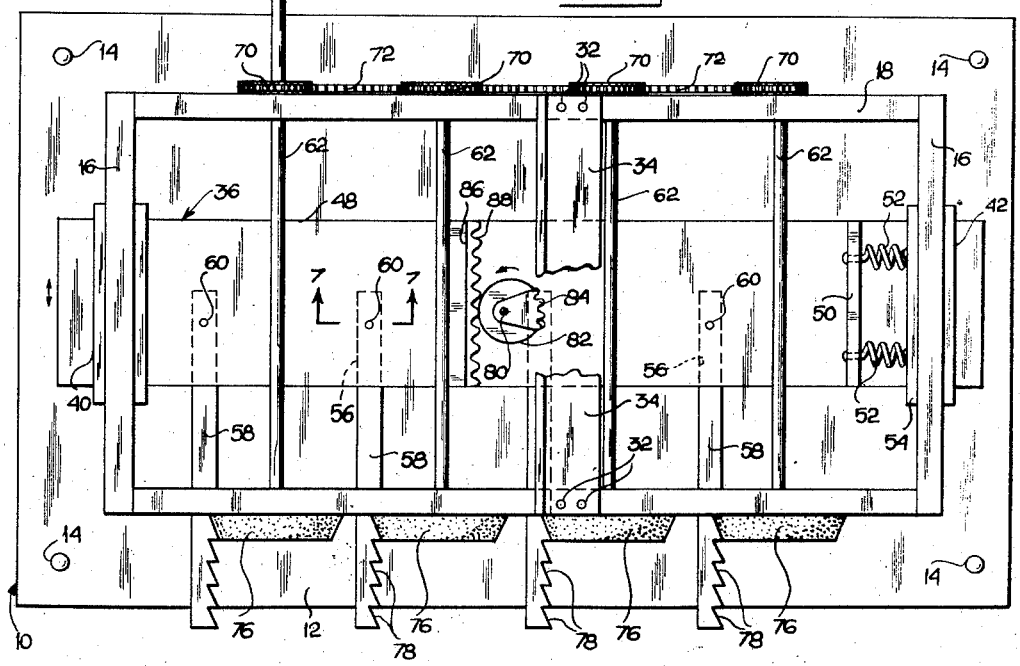
Fig_2_
INVENTOR.
ISRAEL WEINGLAS
BY
ATTORNEY Sept. 23, 1958  I. WEINGLAS  2,852,961
ROTARY DEVICE FOR CUTTING SAW BLADES
Filed May 20, 1957  3 Sheets-Sheet 2

INVENTOR.
ISRAEL WEINGLAS
BY
ATTORNEY

Sept. 23, 1958     I. WEINGLAS     2,852,961
ROTARY DEVICE FOR CUTTING SAW BLADES
Filed May 20, 1957     3 Sheets-Sheet 3
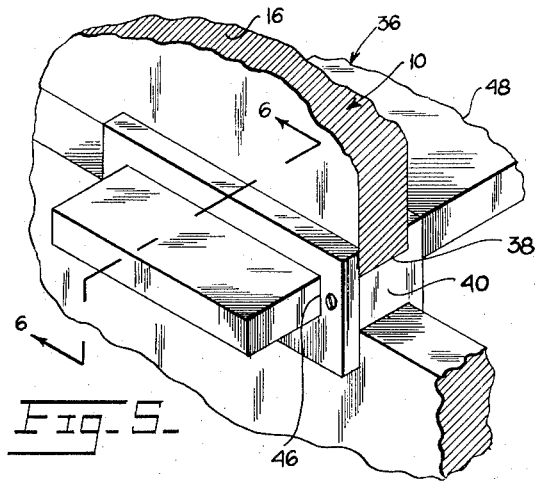
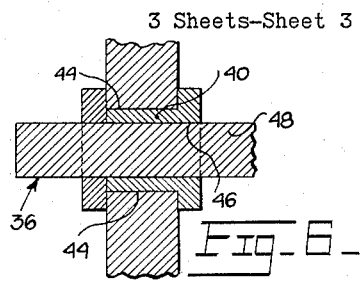
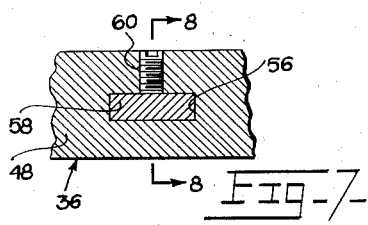
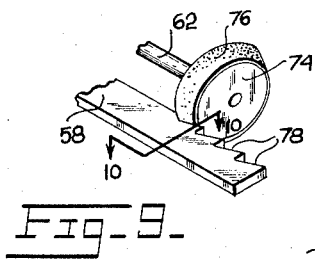
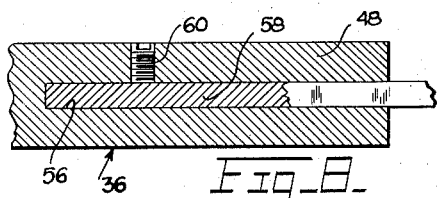
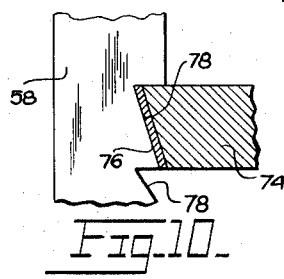
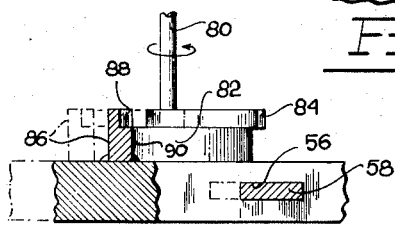
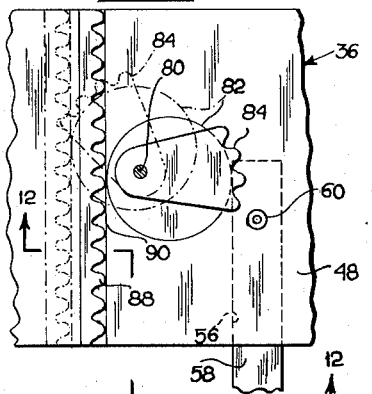
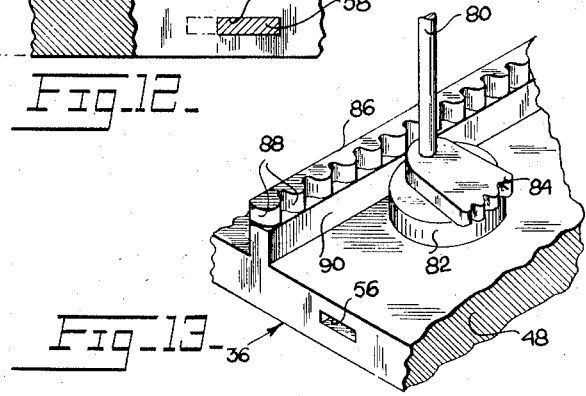
INVENTOR.
ISRAEL WEINGLAS
BY
ATTORNEY United States Patent Office 2,852,961
Patented Sept. 23, 1958

2,852,961

ROTARY DEVICE FOR CUTTING SAW BLADES

Israel Weinglas, New York, N. Y.

Application May 20, 1957, Serial No. 660,366

12 Claims. (Cl. 76—43)

This invention relates to apparatus for making saw blades. More particularly, the invention has regard to a device for simultaneously forming saw teeth on a multiplicity of fine precision saws such as those made for use by jewelers.

The making of saws of the character described has, heretofore, been a relatively expensive process. Only one, or at best a very few, saws can be made at one time, and even those are not of precision construction, unless they are made with exceptional care. Obviously, this results in a substantial increase in the cost of the completed saws.

One important object of the present invention, accordingly, is to provide a device for making jewelers' saws which will permit a large number of the saws to be made at one time.

A further object is to advance all the saws that are being simultaneously made at predetermined intervals, to locate successively following portions of the stock in position to be notched by a rotary cutter, for the purpose of forming teeth on the blades.

A further object is to embody in the apparatus a novel means for advancing the saw blades transversely into engagement with the periphery of the cutter, for notching the blades, then retracting the blades in a transverse direction out of engagement with the cutters, then advancing the blades longitudinally for the purpose of exposing to the cutter a new area to be notched, and then once again initiating the cycle by advancing the blade in a transverse direction toward the cutter for forming the new notch.

A further object is to provide, in apparatus of the character described, a particularly simple means for producing the advancement of the blade, and its movement into and out of engagement with the rotary cutter.

Still another object is to facilitate the mounting of a plurality of pieces of stock to be formed into jewelers' saws, and also facilitate the removal of said pieces after the saws have been completely formed.

A further object of importance is to incorporate in the construction a linkage adapted for driving a large number of cutters simultaneously from a common source of motive power.

Another object is to include in the apparatus a carriage that will be adapted for carrying a large number of saws, with said carriage being bodily movable in directions transversely and longitudinally of the saws, for the purpose of effecting the previously referred to movement of the saw blades in respect to the rotary cutters.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of apparatus according to the present invention.

Fig. 2 is a top plan view, a portion being broken away.

Fig. 5 is an enlarged, fragmentary perspective view showing the mounting of the carriage in one of the end plates.

Fig. 6 is a detail sectional view substantially on line 6—6 of Fig. 5.

Fig. 7 is an enlarged, detail sectional view substantially on line 7—7 of Fig. 2.

Fig. 8 is a detail sectional view on the same scale as Fig. 7, taken substantially on line 8—8 of Fig. 7.

Fig. 9 is a fragmentary perspective view of one of the cutters and blades.

Fig. 10 is an enlarged, detail sectional view substantially on line 10—10 of Fig. 9.

Fig. 11 is an enlarged, plan sectional view substantially on line 11—11 of Fig. 1, the dotted lines showing a position of the parts when the blades are moved out of engagement with the cutters.

Fig. 12 is a view on the same scale as Fig. 11, taken substantially on line 12—12 of Fig. 11.

Fig. 13 is an enlarged, fragmentary perspective view of the means for shifting the blades.

Figures 3, 4:
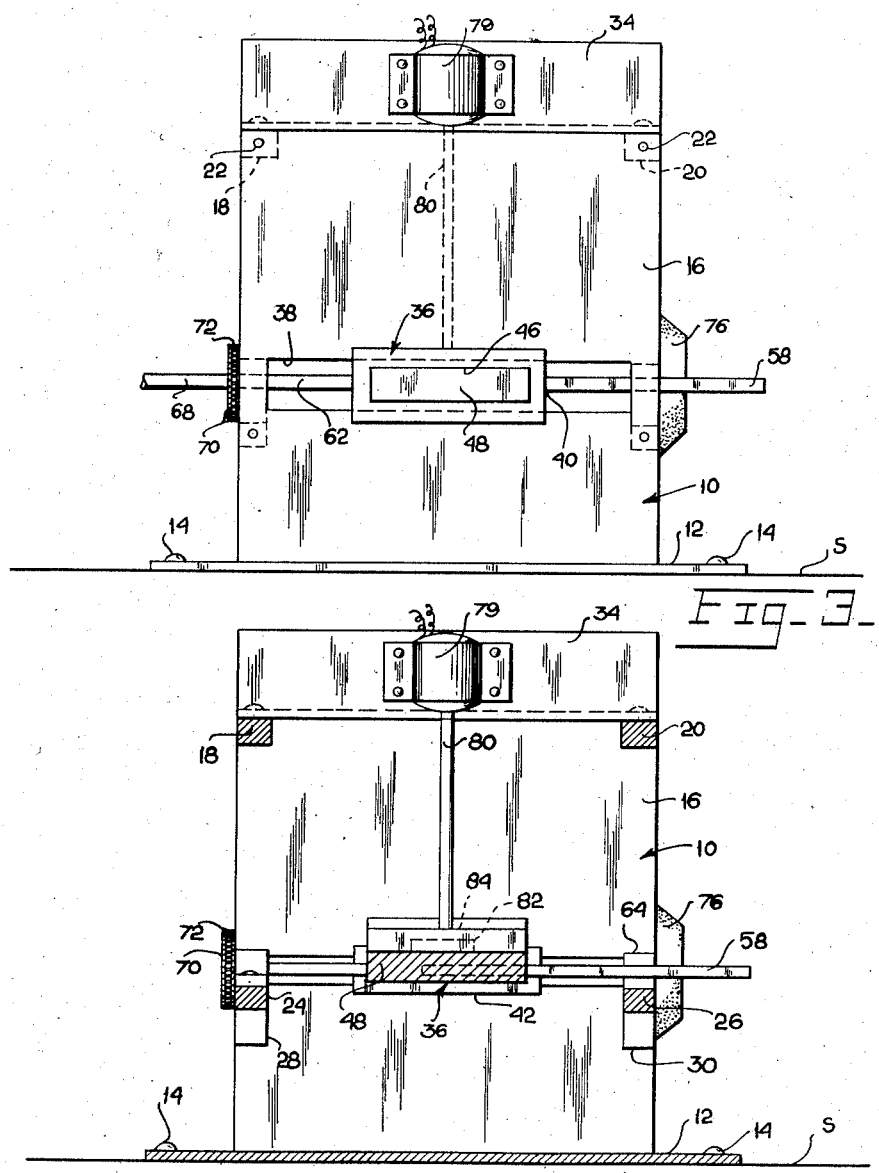
Fig. 3 is an end elevational view of the apparatus as seen from the left of Fig. 1.
Fig. 4 is a transverse sectional view substantially on line 4—4 of Fig. 1.

Referring to the drawings in detail, the device constituting the present invention includes a stationary support frame generally designated 10. Frame 10 has a flat, rectangular base plate 12 bolted or otherwise secured to a supporting surface S by corner bolts 14.

Welded or otherwise fixedly secured to the base plate 12, adjacent opposite ends thereof, are rectangular, flat end plates 16, disposed in vertical planes. Connected to the upper corners of the end plates 16 are a horizontal, elongated, straight rear upper frame member 18 and a front upper frame member 20. These are welded or otherwise fixedly secured at their opposite ends to the end plate, or alternatively, as shown in Fig. 3, may be fixedly attached to the end plates by means of bolts 22.

Connected fixedly to the end plates 16 are a rear lower frame member 24 and a front lower frame member 26, these having, as best shown in Figs. 1 and 4, end portions 28, 30 respectively declining in a direction toward the respective end plates, to which said end portions are welded or otherwise fixedly attached.

Bolted at 32 to the frame members 18, 20 is a transversely extending support plate 34 of L-shaped cross section (Fig. 1), which extends transversely of the frame intermediate opposite ends thereof.

This completes the construction of the support frame 10, and supported upon said support frame, for movement from back to front of the frame, is an elongated carriage generally designated 36, which initially is disposed adjacent the back of the frame, but which, during the operation of the device, is progressively moved toward the front of the frame, that is, downwardly in Fig. 2, during the forming of the teeth in the saw blade.

Formed in the end plates 16 are horizontally extending, elongated, guide slots 38. These extend continuously substantially from the back of the frame to the front thereof, as best shown in Fig. 3. Slidable within the slots 38 are slide blocks 40, 42 of the carriage 36. The blocks 40, 42 are of H-shaped cross section as best shown in Figs. 5 and 6, so as to have longitudinal, upwardly and downwardly opening, opposed grooves 44, 44 receiving the top and bottom edge portions of the slots 38. Thus, there are provided guide flanges at opposite sides of each block 40, holding the block assembled with the slots 38 for movement from end to end of the slot.

In the respective blocks 40 there are formed longitudinal slots 46, and slidably engaged in said slots is a support plate 48 of the carriage. Plate 48 extends fully from end to end of the device, as best shown in Fig. 2, projecting at its opposite ends beyond the end plates 16. The plate 48 is slidable in the direction of its length within its associated blocks 40, 42. In other words, the plate 48 is slidable transversely thereof, by being carried with the blocks 40, 42 as the blocks travel along the length of the slots 38. At the same time, however, in any position to which the slide blocks 40 are moved, and in fact during the actual movement of the slide blocks, the plate 48 can be shifted in the direction of its length, in a path perpendicular to the path of movement of the blocks 40, 42.

Therefore, it becomes apparent that plate 48, viewing the same as in Fig. 2, has movement in the direction of its length toward the left and right in Fig. 2, and also has movement transversely, that is in a path normal to said longitudinal movement.

In any event, plate 48 is normally biased in the direction of its length to the right in Fig. 2, and to accomplish this there is provided, integrally upon plate 48 adjacent its right-hand end viewing the same as in Fig. 2, a transversely extending, upwardly projecting wall 50, to which are hooked one end of contractile springs 52, the other ends of which are secured to a vertically elongated inner wall 54 of the slide block 42. Springs 52, tending to contract, normally urge the plate 48 to the right in Fig. 2.

The plate 48 is adapted to carry a plurality of parallel blades 58, in positions spaced longitudinally of the plate 48. To this end, plate 48 in its front side has deep recesses 56, uniformly spaced longitudinally of the plate 48 and extending in depth slightly more than half the transverse dimension of the plate 48, as best shown in Fig. 2. The inner end portions of the blades 58 are adapted to be snugly, removably received in the recesses 56, so that the greatest part of the length of the blades 58 project forwardly from the recesses, with said blades having their lengths arranged perpendicularly to the lengths of the plate 48. Fixedly but releasably engaging the blades 58 in the recesses 56 are setscrews 60 (Figs. 7 and 8).

Extending in parallel relation to the several blades 58 are shafts 62, journalled at their opposite ends in bearings 64, 66 (Fig. 4) mounted upon the front and rear lower frame members 26, 24, respectively. Coaxial with and in direct driving relation to one of the shafts 62 is a drive shaft 68 extending beyond the back of the apparatus as shown in Fig. 2, and connected to a suitable source of motive power, not shown.

To link all the shafts 62 for conjoint rotation in the same direction, the shafts 62 are provided, at the back of the machine, with sprockets 70, about which is trained a sprocket chain 72. Thus, on rotation of shaft 68, all the shafts 62 will be driven conjointly, at the same speed, and in the same direction, to similarly rotate rotary cutter discs 74 each of which is of shallowly frusto-conical formation, as best shown in Figs. 9 and 10, to provide a beveled periphery on the discs, the peripheries of the discs being abrasively faced as at 76 to permit the discs to cut teeth 78 in one edge of the blades 58.

Means is provided for shifting the blades 58 transversely toward the cutting discs and for then, after the disc has cut into the edge of the blade a predetermined distance, shifting the blades 58 away from the discs, and then advancing the blades in the direction of their lengths, to locate a new portion of the blade edges in position to be notched or cut by the cutting discs.

To this end, an electric motor 79 is vertically mounted upon the motor support bracket or plate 34, medially between the front and back of the machine, in vertical position. Extending downwardly from the motor is the shaft 80 thereof, and (see Fig. 13) connected to the lower end of the shaft for rotation with the shaft is a thick, circular cam 82 eccentric to the axis of rotation of the shaft 80. Integral or otherwise made rigid with the cam 82 is a segmental gear 84 all portions of which are spaced inwardly from the periphery of the cam with the exception of the toothed edge thereof. The toothed edge of the segmental gear projects beyond the periphery of the cam disc 82, with said toothed edge being concentric with the axis of rotation of the shaft 80. The projection of the teeth of the segmental gear beyond the cam disc periphery occurs at that location on the cam disc that is radially spaced from the axis of rotation of the disc to the maximum extent, as clearly seen from Fig. 11.

Fixedly secured to and projecting upwardly from plate 48, and extending transversely of the plate from one to the opposite longitudinal edge thereof, is a wall 86, and in the top edge portion of said wall, in the face of the wall that is in confronting relation to the cam disc and segmental gear, there are formed rack teeth 88, below which the wall has a smooth face 90 in confronting relation to cam disc 82.

The cam disc 82 is in continuous contact with the smooth face 90, due to the fact that the springs 52 continually urge the plate 48 in a direction to maintain the wall 86 in engagement with the cam disc.

The wall 86 is shown in Figs. 11 and 12, in full lines, in the position which it assumes when closest to shaft 80. In these circumstances, the blades 58 have been shifted in a direction transversely thereof, that is, to the right in Fig. 2, to their maximum extent, so that the periphery of their respective discs 74 have bit into the edges of the blades to the maximum extent as shown in Fig. 10 to completely form a notch in the saw blade.

The motor 79, as well as the rotary cutters, is in continuous operation, but is of the type including a reduction gear mechanism in its head, causing slow rotation of the shaft 80. The shaft 80 might rotate, for example, at a speed of approximately one revolution per minute. Of course, the speed of rotation of the shaft 80, and the speed of rotation of the cutters, can be selected according to the option of the particular manufacturer, it being mainly important for the purposes of the present application to note that the shaft 80 does rotate at a slow speed, for the purpose of slowly moving the blades 58 transversely toward the peripheries of their cutters, slowly moving the blades 58 transversely away from the cutters, and then slowly advancing the blades in the direction of their lengths to locate a fresh portion at a position to be cut by the cutters, before the blade is again moved transversely toward the cutters.

Considering the operation, it will be noted that as shaft 80 slowly rotates counterclockwise in Figs. 2 and 11, it will progressively cause the plate 48 to be shifted from its position in these figures of the drawing to the left. In other words, assuming that the parts are initially in their full line position of Figs. 11 and 12, on rotation of shaft 80 a distance sufficient to move the cam disc and segmental gear from their full line to their dotted line position of Fig. 11, that is, an angular distance of approximately 140° from the full line position of Fig. 11, the wall 86 will have been shifted from the full to the dotted line position of Fig. 11. This means that plate 48 will be caused to be correspondingly moved, sliding in the direction of its length within the slide blocks. This in turn causes the blades 58 to be moved transversely to the left in Fig. 2 out of engagement with their cutters.

Continued rotation of the shaft will now cause the teeth of the gear to mesh with the teeth of the rack 88, and this will cause the plate 48 to be now shifted in a direction transversely thereof, causing blades 58 to be advanced in the direction of their lengths, to locate a fresh portion of their edges in position to be cut by the associated cutting discs.

Continued rotation of the shaft 80 will now move the teeth of the segmental gear out of engagement with the rack, and will begin to move the cam disc through the second half of its single rotational cycle from its full line position of Fig. 11. As a result, the wall 86 will now begin to move from the dotted to the full line position of Fig. 11. It may be noted that as soon as the teeth of the segmental gear have moved out of mesh with the rack, the plate 48 will be no longer under any force tending to shift the same in a direction to advance the blades longitudinally of the blades. Therefore, as the plate 48 beings to move once again to the right in Fig. 2 under the pulling force of its springs, the blades 58 will be now shifted transversely toward their cutting discs, slowly causing the blades to be brought into engagement with the discs, with the discs rotating at high speed to slowly form a new notch in the several blades. Ultimately, when the notches are cut to their full depths, the cam disc will be in the full line position of Fig. 11 once again, that is, shaft 80 will have turned through one full cycle. The operation is, of course, continuous and is repeated so that the blades are successively moved away from the cutting disc after complete forming of a tooth notch, then advanced, then moved back toward the cutting disc for forming of a new notch, etc. The dimensions of the rack teeth and gear segment teeth are such that the blade 58 will be moved longitudinally a distance equal to a single notch. Furthermore, the friction between the disc 82 and smooth face 90 of wall 86 is not sufficient to move plate 48 accidentally.

Of course, although only four cutting discs and blades are illustrated by way of example, the number of cutting discs in a single machine is at the option of the manufacturer. There might, for example, be provided a machine in which perhaps twenty or thirty of the baldes, or even more, are mounted upon a single plate 48, to be simultaneously cut by a corresponding number of cutting discs, all linked for direct drive.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame.

2. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, the plate having along one longitudinal edge thereof a recess for receiving said blade, the blade projecting at one end a substantial distance outwardly from the plate in position extending across the plane of rotation of the disc for notching of said edge of the blade by the disc.

3. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said blocks being of H-shaped cross section so as to lap the walls of the slots at opposite sides thereof, thus to hold the blocks properly positioned within the slots during the sliding movement of the blocks in the slots of the frame.

4. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said blocks being of H-shaped cross section so as to lap the walls of the slots at opposite sides thereof, thus to hold the blocks properly positioned within the slots during the sliding movement of the blocks in the slots of the frame, each block having an elongated longitudinal slot through which the plate extends and in which the plate is slidably engaged.

5. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said blocks being of H-shaped cross section so as to lap the walls of the slots at opposite sides thereof, thus to hold the blocks properly positioned within the slots during the sliding movement of the blocks in the slots of the frame, each block having an elongated longitudinal slot through which the plate extends and in which the plate is slidably engaged, said plate being of elongated, flat formation and having a front edge, the blade projecting a substantial distance outwardly from said front edge.

6. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said blocks being of H-shaped cross section so as to lap the walls of the slots at opposite sides thereof, thus to hold the blocks properly positioned within the slots during the sliding movement of the blocks in the slots of the frame, each block having an elongated longitudinal slot through which the plate extends and in which the plate is slidably engaged, said plate being of elongated, flat formation and having a front edge, the blade projecting a substantial distance outwardly from said front edge, said disc having a beveled periphery to form a notch in said edge of the blade, which notch corresponds in shape to the cross-sectional shape of the peripheral portion of the disc.

7. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said means for imparting said movement to the carriage including a shaft, an eccentric rotating with the shaft, and a wall extending transversely of the plate in engagement with the eccentric, for biasing of said wall toward and away from said shaft responsive to rotation of the shaft to produce a corresponding, reciprocating movement of the plate in the direction of its length.

8. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said means for imparting said movement to the carriage including a shaft, an eccentric rotating with the shaft, and a wall extending transversely of the plate in engagement with the eccentric, for biasing of said wall toward and away from said shaft responsive to rotation of the shaft to produce a corresponding, reciprocating movement of the plate in the direction of its length, said wall being formed with rack teeth, said means for imparting said movements to the carriage further including a gear adapted to mesh with said rack teeth to impart movement to the plate in a direction longitudinally of the blade.

9. A rotary cutting apparatus for making saw blades comprising a frame, at least one cutting disc rotatably mounted thereon and having a abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said means for imparting said movement to the carriage including a shaft, an eccentric rotating with the shaft, and a wall extending transversely of the plate in engagement with the eccentric, for biasing of said wall toward and away from said shaft responsive to rotation of the shaft to produce a corresponding, reciprocating movement of the plate in the direction of its length, said wall being formed with rack teeth, said means for imparting said movements to the carriage further including a gear adapted to mesh with said rack teeth to impart movement to the plate in a direction longitudinally of the blade, said gear being of segmental shape so as to mesh with the teeth of the rack through only part of a single cycle of rotation of the shaft.

10. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said means for imparting said movement to the carriage including a shaft, an eccentric rotating with the shaft, and a wall extending transversely of the plate in engagement with the eccentric, for biasing of said wall toward and away from said shaft responsive to rotation of the shaft to produce a corresponding, reciprocating movement of the plate in the direction of its length, said wall being formed with rack teeth, said means for imparting said movements to the carriage further including a gear adapted to mesh with said rack teeth to impart movement to the plate in a direction longitudinally of the blade, said gear being of segmental shape so as to mesh with the teeth of the rack through only part of a single cycle of rotation of the shaft, the teeth of the segmental gear projecting beyond the eccentric at that location upon the periphery of the eccentric at which the periphery of the eccentric is radially spaced its maximum distance from the axis of rotation of the shaft.

11. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said carriage including spring means normally biasing the plate in a direction to shift the blade transversely toward the disc.

12. A rotary cutting apparatus for making saw blades comprising a frame, at least one cutting disc rotatably mounted thereon and having an abrasively faced periphery, a carriage adapted for supporting at least one blade, one edge of which is to be notched by the disc, said carriage being mounted on the frame for reciprocating movement in a path transversely of the blade to move the blade into and out of engagement with the disc, and for movement longitudinally of the blade to locate successively following portions of said edge in confronting relation to the disc, and means on the frame for imparting said movements to the carriage, the frame having guide slots at its ends, the carriage including blocks slidably engaged in said slots and a plate sliding in the blocks in a path normal to the path of sliding movement of the blocks in the frame, said carriage including spring means normally biasing the plate in a direction to shift the blade transversely toward the disc, said spring means comprising at least one contractile spring connected between the plate and one of said slide blocks, and tensioned to bias the plate in the direction of its length transversely of said associated slide block.

References Cited in the file of this patent

UNITED STATES PATENTS

| | | |
|---|---|---|
| 84,229 | Stewart | Nov. 17, 1868 |
| 204,402 | Watson | May 28, 1878 |
| 360,679 | Gaskin | Apr. 5, 1887 |

FOREIGN PATENTS

| | | |
|---|---|---|
| 524,324 | Belgium | Dec. 15, 1953 |